United States Patent Office 2,937,103
Patented May 17, 1960

2,937,103

TALL OIL FATTY ACID CONTAINING LINOLEUM CEMENT

Alan K. Forsythe, Manor Township, Lancaster County, Pa., assignor to Armstrong Cork Company, Lancaster, Pa., a corporation of Pennsylvania No Drawing. Application April 29, 1957
Serial No. 655,495

7 Claims. (Cl. 106—123)

This invention relates to linoleum cements and to a method of making the same. More particularly, the invention relates to a linoleum cement containing oxidized esters of tall oil fatty acids prepared by a method which includes heating a mixture containing tall oil fatty acids and a polyhydric alcohol while passing air therethrough. This application is a continuation-in-part of copending application Serial No. 379,069, now abandoned.

Linoleum cements have been made for a number of years from a drying oil and a resin, preferably rosin, by a number of methods which result in the production of a siccative oil-rosin gel by oxidizing and polymerizing the drying oil, generally in the presence of the resinous material. Ordinarily linoleum cements comprise about 65% to about 85% drying oil and about 15% to about 35% rosin. For many years linoleum cements were manufactured from rosin and a vegetable siccative oil, for example a drying oil such as linseed oil, or a semidrying oil such as soya bean oil. However, recently other materials have been proposed for use in place of a portion or all of the drying oil component of the linoleum cement. For example, tall oil has been proposed as a replacement for a portion of the drying oil component of the cement.

Tall oil is a by-product of the manufacture of kraft paper by the sulfate process from pine or fir wood and is generally considered to be a mixture of fatty acids, rosin acids, and unsaponifiable material. Generally speaking, a typical crude tall oil contains about 35% to about 50% rosin acid, about 40% to about 50% fatty acids, and about 5% to about 10% sterols, hydrocarbons, and other unsaponifiables. The fatty acid fraction includes saturated fatty acids, oleic acid, and linoleic acid. Linoleum cements containing substantial quantities of tall oil have been prepared and successfully employed in the manufacture of linoleum compositions. These compositions may be employed in the preparation of floor or wall coverings which have generally the flexibility and resilience found in linoleum which is prepared from a siccative oil-rosin gel produced by the oxidation and polymerization of a drying oil such as linseed oil and rosin.

Generally speaking, however, cements containing tall oil are somewhat more thermoplastic than ordinary linoleum cements. Floor coverings manufactured from compositions containing such cements may soften at elevated temperatures, thereby resulting in excessive indentation and a fairly high degree of dirt retention. Thus these floor coverings may be adversely affected in warm climates or under extreme summer conditions. In addition, the substitution of tall oil for a portion of the drying oil in the formulation of linoleum cement requires the conventional amount of total rosin present. Furthermore, the fatty acids in tall oil reduce the alkali resistance and are detrimental to the drying properties of the composition.

In order to overcome the disadvantages resulting from the use of tall oil as a partial replacement for drying oil in the production of linoleum cement, it has been proposed to manufacture linoleum cement from partial esters of tall oil, such as those obtained by heating tall oil in the presence of a polyhydric alcohol, for example, pentaerythritol. Such processes esterify the fatty acid portion only of tall oil and leave the rosin acid portion unesterified. Such linoleum cements are described and claimed in U.S. Patent No. 2,752,262—Dunlap. However, it was believed that in order to obtain the desired properties in the final product, it was essential to utilize a two-stage process in which the tall oil fatty acid esters were formed as a first step, and those esters and other ingredients were then subjected to oxidation as a second step. The two-stage process appeared necessary to obtain the required properties for use in the manufacture of a resilient floor covering such as linoleum. This belief resulted from the very complex nature of tall oil itself, of the complexities of the esterification process, and of the bewildering complex of reactions which occur in the oxidizers normally employed in the production of linoleum cement.

Additionally, the temperatures necessary to carry out the esterification and the subsequent oxidation were sufficiently different that the two-stage process appeared essential. As stated in the aforesaid Dunlap patent, the esterification step demands a temperature of at least about 180° C. (356° F.), while the upper limit of the temperature during oxidation is 240° F. Thus it appears that the two steps must be carried out separately.

Furthermore, in the varnish art, as exemplified by U.S. Patent No. 2,539,975—Spitzer et al., it is shown that the simultaneous esterification and oxidation of tall oil at temperatures within the range of 200° C. to 300° C. produce an oil which is nothing like the gel which must be produced if the product is to serve as a linoleum cement. Hence prior technology points to the fact that the production of a linoleum cement from tall oil must be carried out in a two-stage process wherein esterification of the tall oil fatty acids is accomplished first, and oxidation of the mixture containing those esters is accomplished second.

It is the surprising and unexpected contribution of the present invention that the esterification and the oxidation steps may be carried out simultaneously. It has now been found that highly desirable linoleum cements can be prepared by heating a mixture containing tall oil fatty acids, rosin, and a polyhydric alcohol containing 3–5 carbon atoms while passing air therethrough so that esterification and oxidation to a gel are obtained in a single operation. The temperature should be in the range of about 160°–240° F.

The polyhydric alcohol used as a component of the mixture subjected to heat in the presence of air in accordance with this invention should contain from 3–5 carbon atoms and may, for example, be glycerine, pentaerythritol, or methyl glucoside. In order to obtain the desired oxidation and esterification, the temperature of the reaction mass should be at least 160° F. At temperatures lower than about 160° F. the reactions are so slow as to be impractical. The upper limit of temperature during the reactions should be about 240° F. Temperatures higher than this will not produce the gel so essential to form linoleum products; instead products will be formed which are similar to those obtained in the varnish art, and these products are completely unsuitable for the purpose intended herein. The simultaneous oxidation and esterification may be conducted over a period of about 10 hours to about 35 hours, depending upon the temperature conditions prevailing in the reaction vessel, the charge, and the like. In accordance with known technics, catalysts will be used in the reaction. Typical catalysts are lead and manganese naphthenates, calcium naphthenate, zirconium naphthenate, rare earth naphthenates, boron trifluoride-ammonium complex, boron trifluoride-piperidene complex, trifluoro acetic acid, para toluene sulfonic acid, zinc chloride, aluminum chloride, barium acetate, anthraquinone, and the like.

It must be emphasized that the esterification of the fatty acid content only of tall oil, plus the simultaneous or subsequent oxidation thereof, will not produce a usable linoleum cement; the rosin content will be too high. Accordingly, the mixture to be oxidized must be adjusted to contain the proper amount of rosin. A typical tall oil will have a fatty acid number of 70, a rosin acid number of 96, and a total acid number of 166. To form a usable linoleum cement, the rosin acid number of the mixture should be in the range of about 35–48. Since the rosin acids in the mixture are substantially unaffected through out the entire process, it does not matter whether the rosin acid number be determined prior or subsequent to oxidation, although the rosin acid numbers are more easily obtained prior to gel formation.

It can be seen then that the rosin acid number must be adjusted in the present mixture prior to esterification and oxidation if a linoleum cement is to be obtained. This adjustment may be accomplished in one or more of many ways. A vegetable drying oil such as linseed oil or soya bean oil may be added to the tall oil in amounts sufficient to reduce the rosin acid number to the requisite range. Alternatively, tall oil fatty acids obtained, usually, by the distillation of tall oil may be added to the tall oil so as to enrich the mixture in the tall oil fatty acids. Alternatively, the reduction in rosin acid number may be accomplished by the removal of rosin from a tall oil. Any of these technics may be used subject to the requirement that the rosin acid number of the final mixture be in the range of about 35–48.

The amount of polyhydric alcohol containing 3–5 carbon atoms to be used will generally be that amount which is equal, on an equivalent basis, to the tall oil fatty acid content of the mixture to be esterified and oxidized. To aid in the esterification, it is preferred that a slight excess of the polyhydric alcohol or the fatty acids be used, as for example 1.1 equivalent of polyhydric alcohol for each equivalent of tall oil fatty acids to be esterified, or vice versa.

The linoleum cement prepared by the present process can be an all tall oil, cement obtained by adding tall oil fatty acids to tall oil, or a synthetic tall oil mixture may be used by starting with tall oil fatty acids and adding the proper amount of rosin thereto. Alternatively, where tall oil is used as the starting point and a vegetable siccative oil is to be added thereto, the amount of vegetable siccative oil to be added to yield the rosin acid number within the required range will generally be in the range of about 30–65% by weight vegetable siccative oil based on the weight of the final composition. It will be seen that various gradations of the mixture may also be prepared, as by the addition to a tall oil of certain amounts of tall oil fatty acids and certain amounts of a vegetable siccative oil.

The rosin acid number will be determined by the Modified Wolff Method, ASTM D803–49T. Particularly advantageous results have been obtained with mixtures having rosin acid numbers of about 40 to about 43.

If the polyhydric alcohol is insoluble in the mixture, as is the case with pentaerythritol, it may be solubilized by reacting it with the tall oil fatty acids to form the mono ester at the normal and higher esterification temperatures, usually about 400° F. Solubilization may be accomplished by heating the materials of say about 392° F. for a period of time up to about one-half hour. Once the alcohol has become solubilized, the process of the present invention may then be carried out. If desired, an insoluble alcohol such as pentaerythritol may be dispersed in one of the component oils by means of a colloid mill or high shear mixer. The resulting dispersion may be charged to the reaction vessel with the remaining components of the reaction mixture, whereupon highly desirable cements are obtained.

The following examples illustrate several embodiments of the invention.

*Example I*

A mixture containing 1855 grams of tall oil and 100 grams of pentaerythritol was heated at a temperature of about 392° F. for about one-half hour to form the mono ester, thereby rendering the pentaerythritol soluble. 295 grams of the resulting material was charged to an oxidizer together with 206 grams of linseed oil and 20 cc. of driers (lead, 14.4% by weight, and manganese, 0.025% by weight, as naphthenates). The resulting mixture was heated at 180° F. while passing air therethrough at a rate of about 6 cubic feet per minute for 1233 minutes. The resulting material was a tacky gel-like product suitable for use as a linoleum cement.

*Example II*

1855 grams of tall oil and 100 grams of pentaerythritol were heated at about 392° F. for about one-half hour to form the mono ester and thereby render the pentaerythritol soluble. 246 grams of the resulting material were charged to an oxidizer, together with 254 grams of linseed oil, 20 cc. driers (lead and manganese naphthenate) and 5 grams para toluene sulfonic acid. The mass was heated at 200° F. for 1056 minutes while passing air therethrough at a rate of about 6 cubic feet per minute. The resulting material was a tacky gel which was suitable for use as a linoleum cement.

*Example III*

805 grams of tall oil, 945 grams of tall oil fatty acids, and 162 grams of pentaerythritol were heated at 392° F. for about one-half hour to form the mono ester, thereby rendering the pentaerythritol soluble. 500 grams of the resulting material, 20 cc. driers (lead and manganese naphphenate) and 5 grams para toluene sulfonic acid were charged to an oxidizer and heated at 220° F. for about 600 minutes while passing air therethrough at a rate of about 6 cubic feet per minute. The resulting material was a tacky gel suitable for use in the manufacture of linoleum-like floor coverings.

*Example IV*

249 grams of crude tall oil, 222.3 grams of linseed oil, and 20 cc. driers (lead and manganese naphthenate) were charged to an oxidizer together with 28.7 grams of a paste containing 50% by weight thereof of pentaerythritol dispersed in linseed oil. The charge was heated at 180° F. for 1766 minutes while passing air therethrough at a rate of about 6 cubic feet per minute. The resulting product was a tacky gel suitable for use in the preparation of linoleum.

*Example V*

251 grams of crude tall oil, 237.1 grams of linseed oil, 11.9 grams of glycerol, and 20 cc. driers (lead and manganese naphthenate) were charged to an oxidizer. The mass was heated at a temperature of about 180° F. for 1463 minutes while passing air therethrough at a rate of about 6 cubic feet per minute. The resulting product was a tacky gel suitable for use as a linoleum cement.

*Example VI*

251 grams of crude tall oil, 228.8 grams of linseed oil, 20.2 grams of methyl glycoside, and 20 cc. driers (lead and manganese naphthenate) were charged to an oxidizer. The mass was heated at a temperature of about 180° F. for 1236 minutes while passing air therethrough at a rate of about 6 cubic feet per minute. The resulting material was a tacky gel suitable for use in the production of linoleum.

*Example VII*

267.5 grams of crude tall oil, 185.5 grams of linseed oil, 47.0 grams of a paste consisting of 36.4% by weight thereof of pentaerythritol dispersed in linseed oil, and 20 cc. driers (lead and manganese naphthenate) were charged to an oxidizer. The resulting mass was heated at a temperature of 180° F. for 1472 minutes while passing air therethrough at a rate of about 6 cubic feet per minute. The resulting product was a tacky gel suitable for use as a linoleum cement.

The products of the above examples may be compounded with pigments and fillers to produce a linoleum composition which can be calendered onto a suitable backing such as burlap, felt, and the like, and stoved in conventional linoleum stoves to produce a resilient floor covering. Typical of a formulation which can be used to produce linoleum in acordance with this invention is the following:

*Example VIII*

| | Grams |
|---|---|
| Product of Example I | 222 |
| Wood flour | 144 |
| Whiting | 234 |

The above composition was formed into a sheet on a mill, calendered, and stoved for 20 to 30 days at 180° F. The resulting product was a resilient hard surface floor covering material. Generally speaking, linoleum compositions contain about 68% to about 58% filler including pigment and about 32% to about 42% binder.

I claim:

1. The process of producing a linoleum cement which comprises forming a mixture comprising the three ingredients (1) tall oil fatty acids, (2) a polyhydric alcohol containing 3–5 carbon atoms in an amount substantially equivalent to said fatty acids, and (3) sufficient rosin to give said mixture a rosin acid number in the range of about 35–48, plus a vegetable siccative oil making up the balance of said mixture when said three ingredients are present in an amount less than 100% by weight of said mixture, and heating said mixture to a temperature in the range of about 160°–240° F. while blowing air therethrough to simultaneously cause (a) complete esterification of said fatty acids with said polyhydric alcohol, and (b) oxidation of the reaction mixture, whereby a gel is formed.

2. A process according to claim 1 wherein said rosin number is in the range of about 40–43.

3. A process according to claim 1 wherein said reaction mixture contains a vegetable siccative oil.

4. A process according to claim 1 wherein said reaction mixture consists essentially of said tall oil fatty acid esters and rosin.

5. A process according to claim 1 wherein said polyhydric alcohol comprises pentaerythritol.

6. A process according to claim 1 wherein said polyhydric alcohol comprises glycerine.

7. A process according to claim 1 wherein said reaction mixture comprises about 30–65% by weight vegetable siccative oil, the balance being tall oil wherein the fatty acid content only of the tall oil has been esterified.

References Cited in the file of this patent

UNITED STATES PATENTS

| 2,439,377 | Bare et al. | Apr. 13, 1948 |
| 2,539,975 | Spitzer | Jan. 30, 1951 |
| 2,752,262 | Dunlap | June 26, 1956 |
| 2,786,773 | Bradley | Apr. 29, 1957 |

FOREIGN PATENTS

| 405,826 | Great Britain | Feb. 15, 1934 |